United States Patent
Midorikawa

(10) Patent No.: US 10,715,726 B2
(45) Date of Patent: Jul. 14, 2020

(54) ELECTRONIC DEVICE, CONTROL METHOD, AND STORAGE MEDIUM

(71) Applicant: CANON KABUSHIKI KAISHA, Tokyo (JP)

(72) Inventor: Kentarou Midorikawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 205 days.

(21) Appl. No.: 15/825,758

(22) Filed: Nov. 29, 2017

(65) Prior Publication Data
US 2018/0160043 A1 Jun. 7, 2018

(30) Foreign Application Priority Data
Dec. 1, 2016 (JP) .................. 2016-234419

(51) Int. Cl.
*H04N 5/232* (2006.01)
*H04N 5/235* (2006.01)

(52) U.S. Cl.
CPC ....... *H04N 5/23241* (2013.01); *H04N 5/2356* (2013.01); *H04N 5/23245* (2013.01); *H04N 5/23293* (2013.01)

(58) Field of Classification Search
CPC .......... H04N 5/23241; H04N 5/23245; H04N 5/23293; H04N 5/2356
See application file for complete search history.

(56) References Cited

FOREIGN PATENT DOCUMENTS

| JP | 2001-127456 A | 5/2001 |
|----|---------------|--------|
| JP | 2002-006377 A | 1/2002 |

OTHER PUBLICATIONS

JP 2002-006377 translation (Year: 2002).*

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

A power control unit of an electronic device executes auto power-OFF that causes the electronic device to automatically switch from a first operation mode to a second operation mode. A setting unit sets a set period. In a case where the auto power-OFF is executed when a period equal to or shorter than a first period is set as the set period, a status control unit performs control so that a first operation status at the time of the execution of the auto power-OFF is taken over when the electronic device is placed in the first operation mode next. In a case where the auto power-OFF is executed when a period longer than the first period is set as the set period, the status control unit performs control so that the first operation status is not taken over.

24 Claims, 10 Drawing Sheets

ELECTRONIC DEVICE, CONTROL METHOD, AND STORAGE MEDIUM

BACKGROUND OF THE INVENTION

Field of the Invention

The present invention relates to an electronic device, a control method, and a storage medium.

Description of the Related Art

Some electronic devices (e.g., digital cameras) perform control to automatically turn OFF the power for power saving reasons if a user operation has not been performed for a certain period (auto power-OFF), even in the middle of the execution of some sort of task (e.g., shooting or reproduction of an image). Conventionally, there have been cases in which a task status is lost against the user's intention when the auto power-OFF is executed.

Japanese Patent Laid-Open No. 2002-6377 and Japanese Patent Laid-Open No. 2001-127456 are known as techniques related to the prevention of loss of a task status. Japanese Patent Laid-Open No. 2002-6377 discloses a camera that, regardless of the state of the power, maintains a set shooting mode until the elapse of a predetermined period since the predetermined time, and sets an initial mode as a shooting mode after the elapse of the predetermined period since the predetermined time. Japanese Patent Laid-Open No. 2001-127456 discloses an electronic device that, upon detection of a state in which a battery cover is removed, saves data that is currently processed to a nonvolatile memory.

Although there is a possibility that a task status is lost against the user's intention when the auto power-OFF is executed, the user does not always wish that a task status prior to the auto power-OFF be taken over when the power is turned ON. However, Japanese Patent Laid-Open No. 2002-6377 and Japanese Patent Laid-Open No. 2001-127456 do not take into consideration handling of a task status at the time of the auto power-OFF, and do not enable appropriate selection of whether to take over a task status prior to the auto power-OFF when the power is turned ON.

SUMMARY OF THE INVENTION

The present invention has been made in view of the foregoing issues, and provides a technique that enables an electronic device to select whether to take over a task status prior to the auto power-OFF more appropriately when the power is turned ON after the auto power-OFF.

According to a first aspect of the present invention, there is provided an electronic device, comprising: a power control unit configured to, in response to a continuous period in which no user operation is executed having reached a set period, execute auto power-OFF that causes the electronic device to automatically switch from a first operation mode to a second operation mode, the second operation mode consuming less power than the first operation mode; a setting unit configured to set the set period; and a status control unit configured to in a case where the auto power-OFF is executed when a period equal to or shorter than a first period is set as the set period, perform control so that a first operation status at the time of the execution of the auto power-OFF is taken over when the electronic device is placed in the first operation mode next, and in a case where the auto power-OFF is executed when a period longer than the first period is set as the set period, perform control so that the first operation status at the time of the execution of the auto power-OFF is not taken over when the electronic device is placed in the first operation mode next.

According to a second aspect of the present invention, there is provided a control method executed by an electronic device, comprising: in response to a continuous period in which no user operation is executed having reached a set period, executing auto power-OFF that causes the electronic device to automatically switch from a first operation mode to a second operation mode, the second operation mode consuming less power than the first operation mode; setting the set period; in a case where the auto power-OFF is executed when a period equal to or shorter than a first period is set as the set period, performing control so that a first operation status at the time of the execution of the auto power-OFF is taken over when the electronic device is placed in the first operation mode next; and in a case where the auto power-OFF is executed when a period longer than the first period is set as the set period, performing control so that the first operation status at the time of the execution of the auto power-OFF is not taken over when the electronic device is placed in the first operation mode next.

According to a third aspect of the present invention, there is provided a non-transitory computer-readable storage medium which stores a program for causing a computer to execute a control method comprising: in response to a continuous period in which no user operation is executed having reached a set period, executing auto power-OFF that causes an electronic device to automatically switch from a first operation mode to a second operation mode, the second operation mode consuming less power than the first operation mode; setting the set period; in a case where the auto power-OFF is executed when a period equal to or shorter than a first period is set as the set period, performing control so that a first operation status at the time of the execution of the auto power-OFF is taken over when the electronic device is placed in the first operation mode next; and in a case where the auto power-OFF is executed when a period longer than the first period is set as the set period, performing control so that the first operation status at the time of the execution of the auto power-OFF is not taken over when the electronic device is placed in the first operation mode next.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1A:
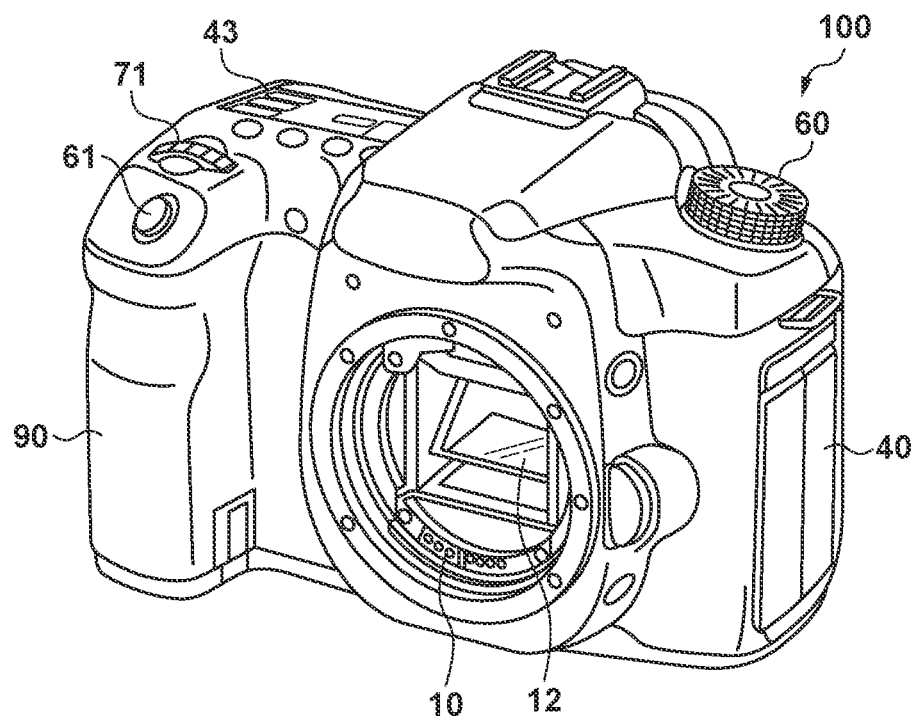
FIGS. 1A and 1B show an outer appearance of a digital camera 100.
Figure 1B:
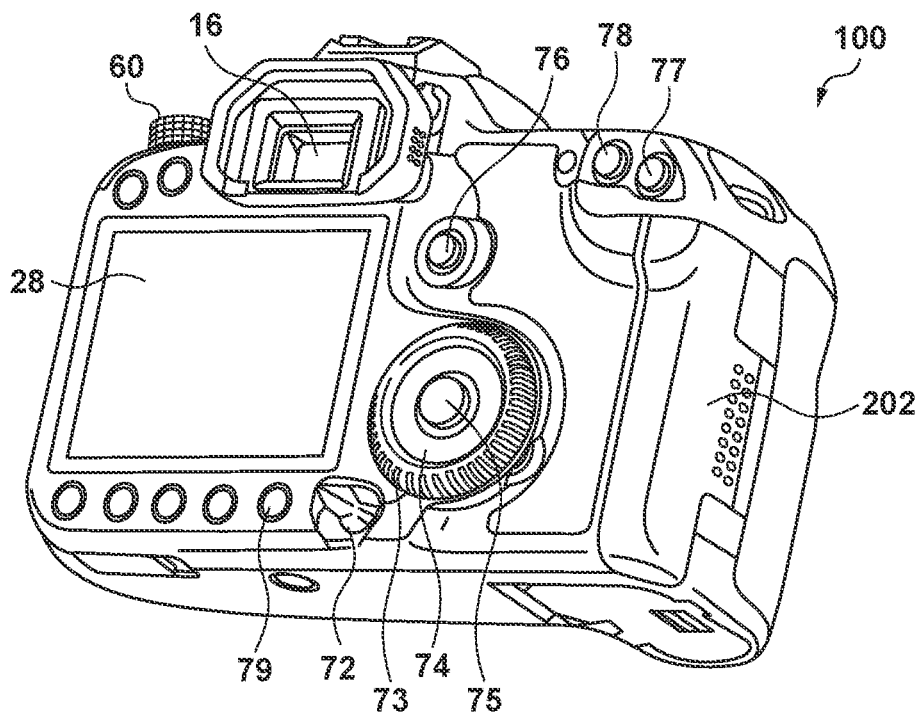

FIGS. 1A and 1B show an outer appearance of a digital camera 100, which is one example of an electronic device to which the present invention can be applied. FIG. 1A is a perspective view of a front face of the digital camera 100, and FIG. 1B is a perspective view of a back face of the digital camera 100. In FIG. 1B, a display unit 28 is a display unit which is mounted on the back face of the camera and displays images and various types of information. An out-of-viewfinder display unit 43 is a display unit which is mounted on a top face of the camera, and displays a variety of setting values of the camera related to a shutter speed, a diaphragm, and so forth. A shutter button 61 is an operation unit for issuing a shooting instruction. A mode change switch 60 is an operation unit for switching between various types of modes. A terminal cover 40 is a cover for protecting a connector (not shown) for, for example, a connection cable that connects between an external apparatus and the digital camera 100. A main electronic dial 71 is a rotary operation member included in an operation unit 70 (described later with reference to FIG. 2), and a user can, for example, change the setting values related to the shutter speed, the diaphragm, and so forth by rotating this main electronic dial 71. A power switch 72 is an operation member for switching between power-ON and power-OFF of the digital camera 100. A sub-electronic dial 73 is a rotary operation member included in the operation unit 70, and is used to move a selection frame, switch to another image, and so forth. A crisscross key 74 is a crisscross key (four-directional key) which is included in the operation unit 70, and its upper, lower, left, and right portions can be independently pushed. By pressing a specific portion of the crisscross key 74, the user can put an operation corresponding to the pressed portion into execution. A SET button 75 is a push button included in the operation unit 70, and is used mainly to decide a selected item, for example. An LV button 76 is a button which is included in the operation unit 70 and switches between ON and OFF (display and non-display) of live view (hereinafter, LV) via a menu button. It is used to issue an instruction for starting or stopping the shooting (recording) of moving images in a moving image shooting mode. An enlarge button 77 is an operation button that is included in the operation unit 70, and intended to switch between ON and OFF of an enlarge mode during live-view display (hereinafter, LV display) of a shooting mode, and to change an enlargement factor during the enlarge mode. In a reproduction mode, the enlarge button 77 has a function of enlarging a reproduced image and increasing the enlargement factor. A reduce button 78 is a button that is included in the operation unit 70, and intended to lower the enlargement factor of a reproduced image in an enlarged state to reduce a displayed image. A reproduction button 79 is an operation button that is included in the operation unit 70 and switches between a shooting mode and a reproduction mode. By pressing the reproduction button 79 during a shooting mode, the user can cause the digital camera 100 to make a transition to a reproduction mode and display the latest image among the images recorded in a recording medium 200 on the display unit 28. An instant return mirror 12 is placed in an up position or a down position by a non-illustrated actuator in response to an instruction from a system control unit 50 (described later with reference to FIG. 2). A communication terminal 10 is a communication terminal with which the digital camera 100 communicates with the lens side (attachable and detachable). An eyepiece viewfinder 16 is a look-through type viewfinder through which the user observes a focusing screen 13 (described later with reference to FIG. 2) and checks the focal point and composition of an optical image of a subject obtained through a lens unit 150 (described later with reference to FIG. 2). A cover 202 is a cover for a slot in which the recording medium 200 is housed. A grip unit 90 is a holding unit that has a shape that allows itself to be easily gripped by the user's right hand while the user is holding the digital camera 100 in position.

Figure 2:
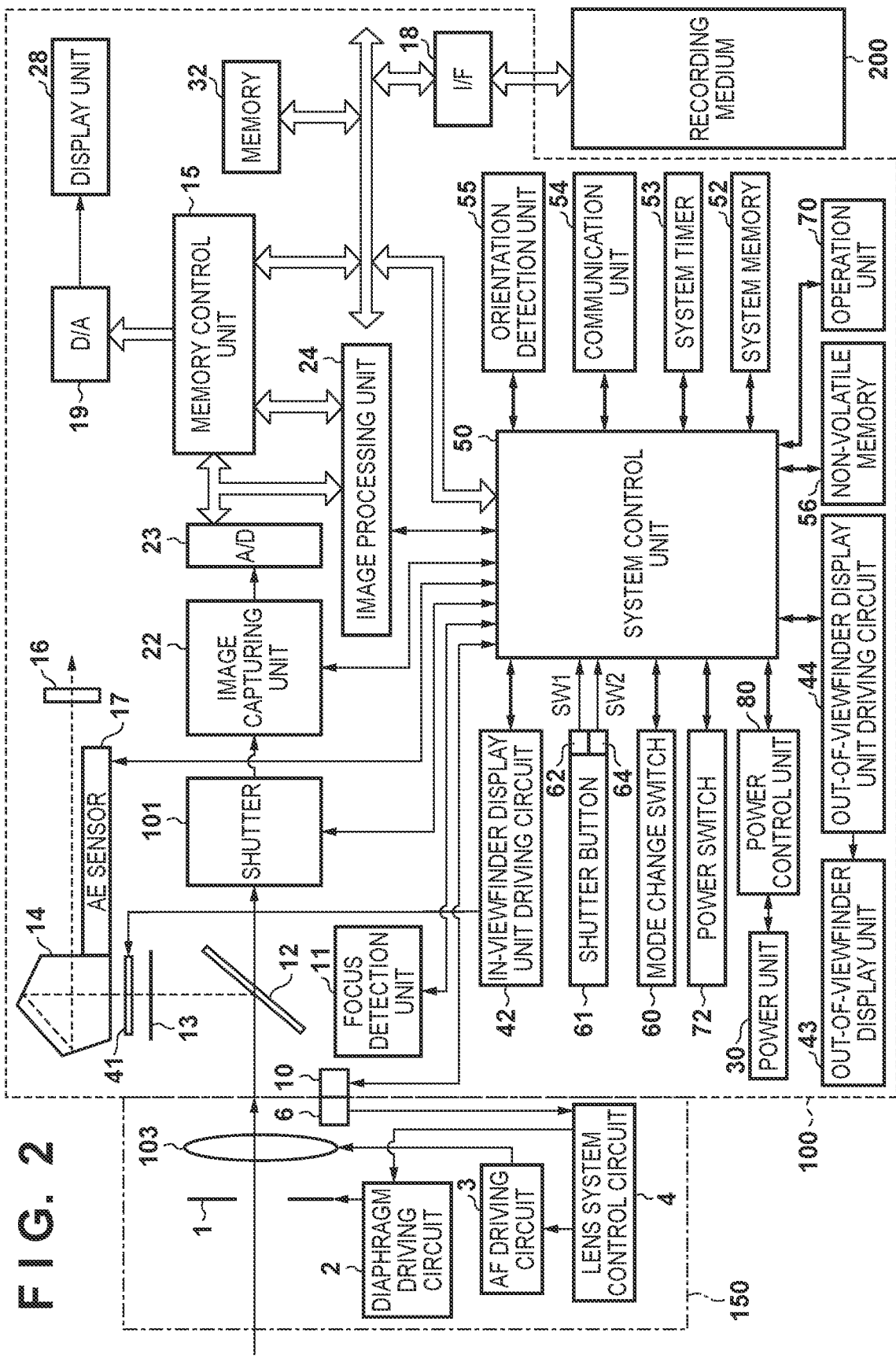
FIG. 2 is a block diagram showing an exemplary configuration of the digital camera 100.

FIG. 2 is a block diagram showing an exemplary configuration of the digital camera 100. In FIG. 2, a lens unit 150 is a lens unit in which an interchangeable photographing lens is installed. Although a lens 103 is normally composed of a plurality of lenses, only one lens is shown in the figure for simplicity. A communication terminal 6 is a communication terminal with which the lens unit 150 communicates with the digital camera 100 side, and the communication terminal 10 is a communication terminal with which the digital camera 100 communicates with the lens unit 150 side. The lens unit 150 communicates with the system control unit 50 via these communication terminals 6 and 10, and achieves an in-focus state by causing an internal lens system control circuit 4 to control a diaphragm 1 via a diaphragm driving circuit 2 and changing the position of the lens 103 via an AF driving circuit 3.

An AE sensor 17 measures the luminance of a subject through the lens unit 150. A focus detection unit 11 outputs defocus amount information to the system control unit 50. The system control unit 50 performs phase-difference AF by controlling the lens unit 150 based on the defocus amount information.

The instant return mirror 12 is placed in the up position or the down position by the non-illustrated actuator in response to an instruction from the system control unit 50 during exposure, live-view shooting (LV shooting), and shooting of moving images. The instant return mirror 12 is a mirror intended to direct a light beam that has been made incident through the lens 103 toward the eyepiece viewfinder 16 or toward an image capturing unit 22. The instant return mirror 12 is normally placed so as to reflect and guide the light beam toward the eyepiece viewfinder 16; on the other hand, during shooting and LV display, it is flipped up to direct the light beam toward the image capturing unit 22 and is retracted from the light beam (placed in the up position). The central portion of the instant return mirror 12 is a half mirror through which a part of the light beam can be transmitted so as to be made incident on the focus detection unit 11 for focus detection.

The user can check the focal point and composition of an optical image of the subject obtained through the lens unit 150 by observing the focusing screen 13 via a pentaprism 14 and the eyepiece viewfinder 16.

A shutter 101 is a focal-plane shutter that can freely control an exposure period of the image capturing unit 22 under control of the system control unit 50. The image capturing unit 22 is an image sensor constituted by, for example, a CCD or CMOS sensor that converts the optical image into electrical signals. An A/D converter 23 converts analog signals into digital signals. The A/D converter 23 is used to convert analog signals output from the image capturing unit 22 into digital signals.

An image processing unit 24 applies predetermined pixel interpolation, resize processing (e.g., size reduction), color conversion processing, and so forth to data from the A/D converter 23 or to data from a memory control unit 15. The image processing unit 24 also executes predetermined calculation processing using captured image data, and the system control unit 50 performs exposure control and ranging control based on the result of the calculation processing. As a result, through-the-lens (TTL) autofocus (AF) processing, auto exposure (AE) processing, and preliminary flash emission (EF) processing are executed. The image processing unit 24 further executes predetermined calculation processing using captured image data, and executes TTL auto white balance (AWB) processing based on the result of the calculation processing.

Output data from the A/D converter 23 is written directly to a memory 32 via the image processing unit 24 and the memory control unit 15, or via the memory control unit 15. The memory 32 stores image data that has been obtained by the image capturing unit 22 and converted into digital data by the A/D converter 23, and image data to be displayed on the display unit 28. The memory 32 has a sufficient storage capacity to store a predetermined number of still images, as well as moving images and audio of a predetermined period. The memory 32 also functions as a memory for displaying images (video memory).

A D/A converter 19 converts data for image display stored in the memory 32 into analog signals, and supplies the analog signals to the display unit 28. Accordingly, image data for display written to the memory 32 is displayed by the display unit 28 via the D/A converter 19. The display unit 28 displays contents corresponding to the analog signals from the D/A converter 19 on a display device, such as an LCD. As digital signals that have undergone A/D conversion in the A/D converter 23 and been accumulated in the memory 32 are converted into analog signals by the D/A converter 19 and then sequentially transferred to and displayed on the display unit 28, the display unit 28 functions as an electronic viewfinder. Thus, through-the-lens images can be displayed (LV display).

An in-viewfinder display unit 41 displays a frame indicating a focus detection area in which autofocus is currently performed (an AF frame), icons indicating the statuses of camera settings, and the like via an in-viewfinder display unit driving circuit 42. The out-of-viewfinder display unit 43 displays a variety of setting values of the camera related to the shutter speed, the diaphragm, and so forth via an out-of-viewfinder display unit driving circuit 44.

A non-volatile memory 56 is an electrically erasable and recordable memory, and examples of which include an EEPROM and the like. The non-volatile memory 56 stores constants for the operations of the system control unit 50, programs, and the like. The programs mentioned here denote programs for executing later-described various types of flowcharts in the present embodiment.

The system control unit 50 is a control unit that includes at least one processor and controls an entirety of the digital camera 100. The system control unit 50 realizes later-described various types of processing according to the present embodiment by executing the aforementioned programs recorded in the non-volatile memory 56. The system control unit 50 also performs display control by controlling the memory 32, the D/A converter 19, the display unit 28, and so forth. A system memory 52 is realized by installing, for example, a RAM. The constants and variables for the operations of the system control unit 50, the programs that have been read out from the non-volatile memory 56, and the like are deployed to the system memory 52.

A system timer 53 is a timing unit that measures periods used for various types of control, and the time indicated by a built-in clock. The mode change switch 60, a first shutter switch 62, a second shutter switch 64, and the operation unit 70 are operation members for inputting various types of operational instructions to the system control unit 50.

The mode change switch 60 switches an operation mode of the system control unit 50 to one of the following modes: a still image recording mode, a moving image shooting mode, a reproduction mode, etc. The still image recording mode includes an auto shooting mode, an auto scene discrimination mode, a manual mode, a diaphragm priority mode (Av mode), and a shutter speed priority mode (Tv mode). The still image recording mode also includes various types of scene modes that each designate shooting settings of a corresponding scene to be shot, a program AE mode, a custom mode, etc. The digital camera 100 is configured such that the mode change switch 60 can switch directly to one of the foregoing modes. Alternatively, the digital camera 100 may be configured such that, after switching to a screen showing a list of shooting modes using the mode change switch 60, one of the plurality of displayed modes is selected, and another operation member is used to switch to the selected mode. Similarly, the moving image shooting mode may include a plurality of modes.

The first shutter switch 62 is turned ON and issues a first shutter switch signal SW1 in the middle of an operation performed on the shutter button 61 mounted on the digital camera 100, that is to say, when the shutter button is pressed halfway (a shooting preparation instruction). In response to the first shutter switch signal SW1, the system control unit 50 starts operations of autofocus (AF) processing, auto exposure (AE) processing, auto white balance (AWB) processing, preliminary flash emission (EF) processing, etc.

The second shutter switch 64 is turned ON and issues a second shutter switch signal SW2 upon completion of the operation performed on the shutter button 61, that is to say, when the shutter button is fully pressed (a shooting instruction). In response to the second shutter switch signal SW2, the system control unit 50 starts operations of a sequence of shooting processing, from readout of signals from the image capturing unit 22 to writing of image data to the recording medium 200.

For example, selecting and operating various types of function icons displayed on the display unit 28 allocate appropriate functions to the operation members of the operation unit 70 on a scene-by-scene basis, and cause the operation members to act as various types of function buttons. Examples of the function buttons include a stop button, a return button, an image switch button, a jump button, a narrow-down button, an attribute change button, etc. For example, when a menu button is pressed, the display unit 28 displays a menu screen on which various types of settings can be configured. The user can intuitively configure various types of settings using the menu screen displayed on the display unit 28, the four-directional button including the upper, lower, left, and right portions, and the SET button.

The operation unit 70 serves as an input unit that accepts user operations, and includes various types of operation members. The operation unit 70 includes at least the following operation units: the shutter button 61, the main electronic dial 71, the power switch 72, the sub-electronic dial 73, the crisscross key 74, the SET button 75, the LV button 76, the enlarge button 77, the reduce button 78, and the reproduction button 79.

A power control unit 80 is composed of a battery detection circuit, a DC/DC converter, a switch circuit for selectively supplying current to blocks, and the like, and detects whether a battery is installed, the type of the battery, and the remaining battery level. The power control unit 80 also controls the DC/DC converter based on the result of the detection and on an instruction from the system control unit 50, and supplies necessary voltage to various components, including the recording medium 200, for a necessary amount of time.

A power unit 30 is constituted by, for example, a primary battery (e.g., an alkaline battery and a lithium battery), a secondary battery (e.g., a NiCd battery, a NiMH battery, and a Li-ion battery), or an AC adaptor. A recording medium I/F 18 is an interface for the recording medium 200, examples of which include a memory card and a hard disk. The recording medium 200 is, for example, a memory card intended to record shot images, and is constituted by a semiconductor memory, a magnetic disk, and the like.

A communication unit 54 is connected to an external device wirelessly or via a wired cable, and transmits and receives video signals and audio signals. The communication unit 54 can also be connected to a wireless local area network (LAN) and the Internet. The communication unit 54 can transmit images captured by the image capturing unit 22 (including through-the-lens images) and images recorded in the recording medium 200, and receive image data and other various types of information from an external device.

An orientation detection unit 55 detects an orientation of the digital camera 100 relative to the direction of gravity. Based on the orientation detected by the orientation detection unit 55, it is possible to discriminate whether an image was shot by the image capturing unit 22 with the digital camera 100 held in a landscape orientation or in a portrait orientation. The system control unit 50 can append directional information corresponding to the orientation detected by the orientation detection unit 55 to an image file of an image captured by the image capturing unit 22, and record an image in a rotated state. For example, an acceleration sensor or a gyroscope can be used as the orientation detection unit 55.

The digital camera 100 can perform shooting with auto exposure bracketing (AEB) whereby a plurality of images are shot using a plurality of exposure values (bracketing values) that have been automatically corrected to be over-exposure values and underexposure values, while using an automatically-set reference exposure value (reference value) as a median. The reference value of the shooting with exposure bracketing may be an exposure correction value set by the user. One of the following candidates is set by the user in advance as the set number of auto bracketing from a menu screen.

Two: shooting is performed using the reference value and one of an overexposure value (bracketing value) and an underexposure value (bracketing value).

Three: images are shot using the reference value, an overexposure bracketing value, and an underexposure bracketing value, respectively.

Five: shooting is performed using the reference value, two different overexposure bracketing values, and two different underexposure bracketing values.

Seven: shooting is performed using the reference value, three different overexposure bracketing values, and three different underexposure bracketing values.

In the shooting with auto bracketing, the digital camera 100 shoots one image in response to one shooting instruction (issued by fully pressing the shutter button 61). The digital camera 100 changes the exposure value per shooting, and ends the shooting with auto bracketing when the set number of images have been shot. For example, when the digital camera 100 is set to a mode that performs shooting with auto bracketing and the set number is three, shooting is performed using the reference value in response to the first shooting instruction. Subsequently, shooting is performed using an overexposure value in response to the second shooting instruction, and shooting is performed using an underexposure value in response to the third shooting instruction; thereafter, shooting control for one bracket-shooting set ends. During the bracket shooting, the digital camera 100 stores a bracket number as a variable for managing the progress of the bracket shooting (how many times shooting has been performed in one bracket-shooting set) by recording the bracket number to the volatile system memory 52. The digital camera 100 decides an exposure value for the next shooting in accordance with the current bracket number. Note that the digital camera 100 may store the bracket number to the non-volatile memory 56 during the bracket shooting.

Figure 3A:
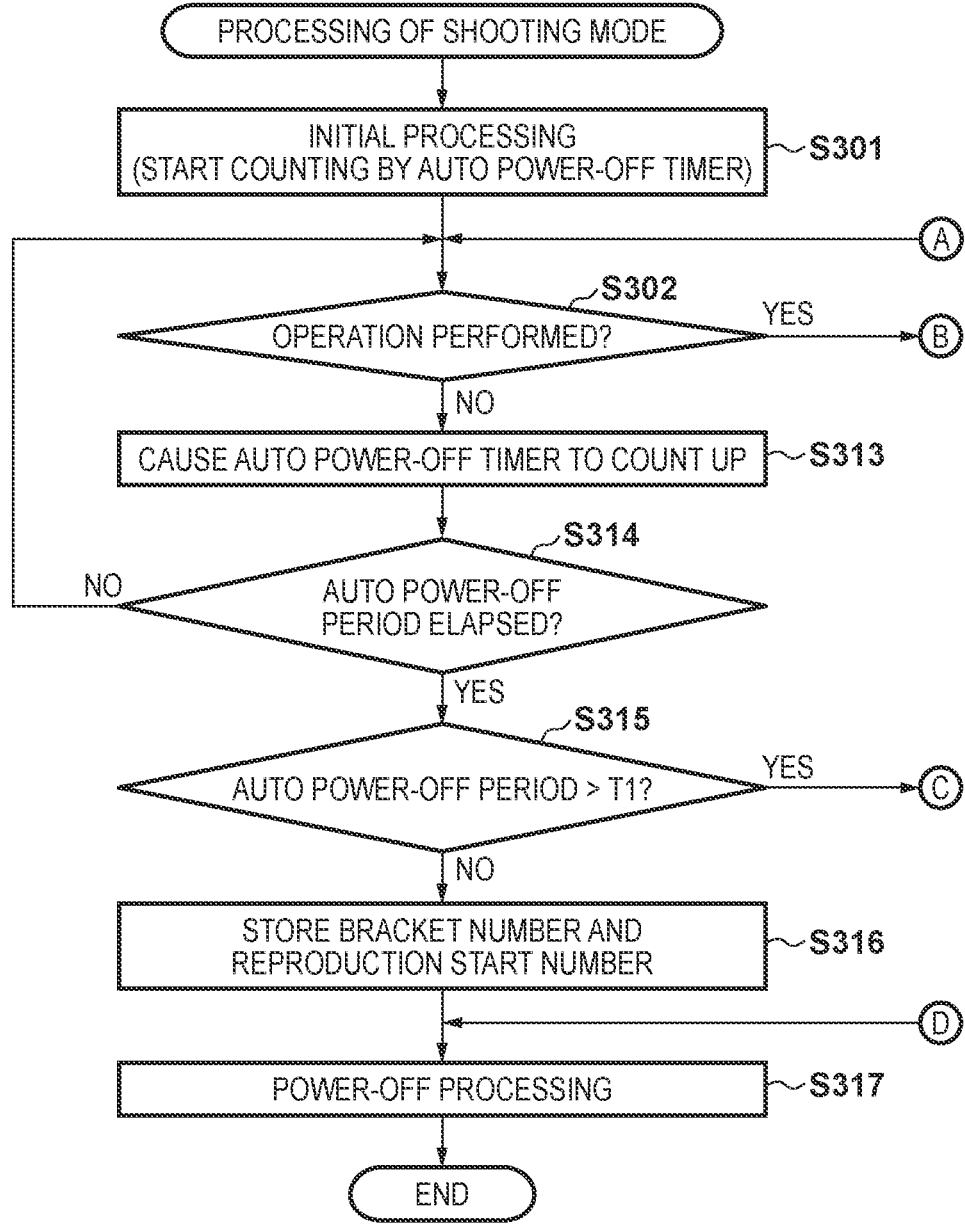
FIGS. 3A and 3B are flowcharts of processing executed by the digital camera 100 in a shooting mode.
Figure 3B:
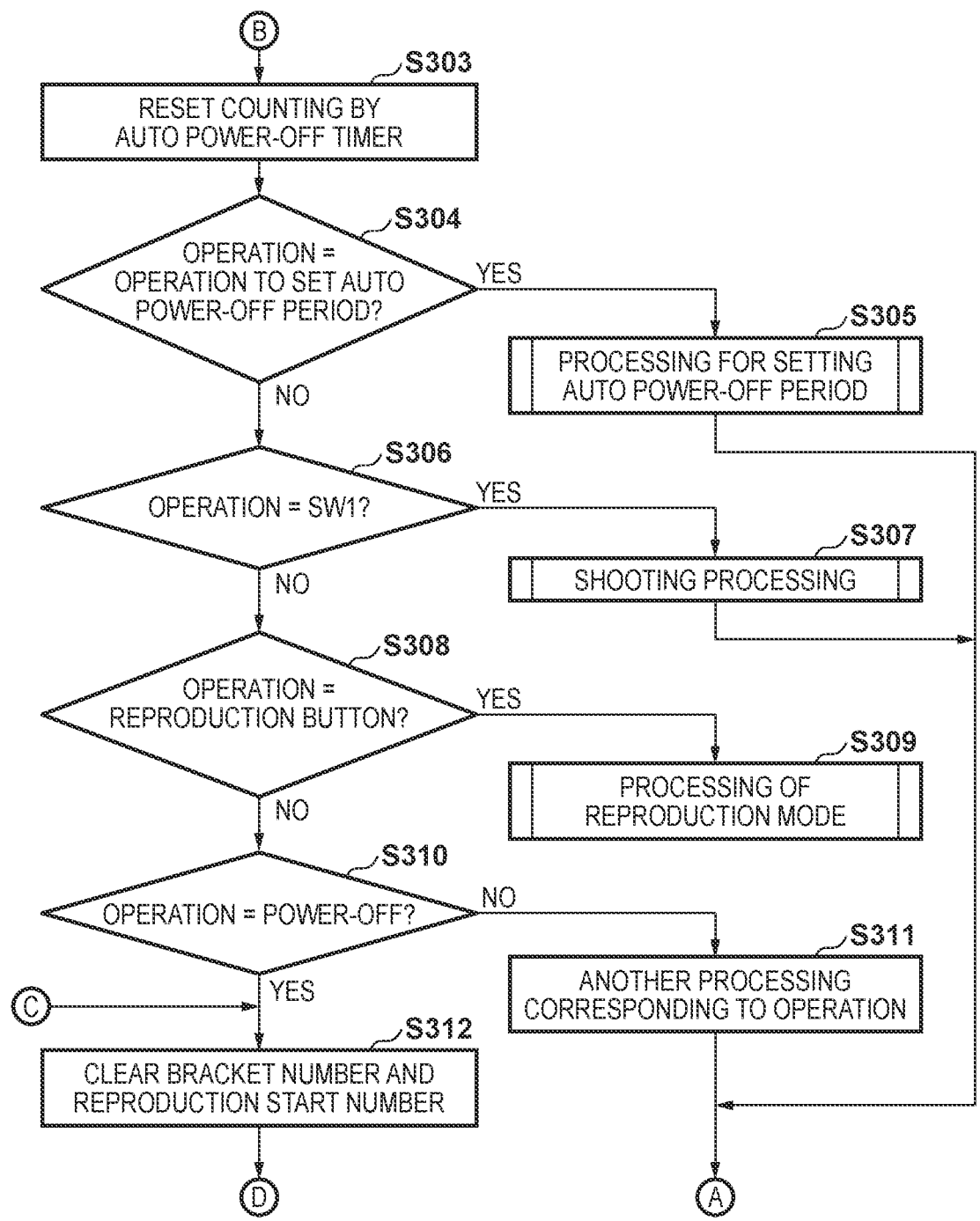

FIGS. 3A and 3B are flowcharts of processing executed by the digital camera 100 in a shooting mode. The processing of FIGS. 3A and 3B is started when the power is turned ON by operating the power switch 72, or when the digital camera 100 makes a transition to a shooting mode from another mode (e.g., a reproduction mode). This processing is realized by deploying a program recorded in the non-volatile memory 56 to the system memory 52 and executing the deployed program in the system control unit 50, unless specifically stated otherwise.

Based on a set period of auto power-OFF, the digital camera 100 switches whether or not to take over a task status at the time of the auto power-OFF when it is placed in a power-ON state next. In the description of FIGS. 3A and 3B, it will be assumed that tasks include bracket shooting and processing of the reproduction mode, and task statuses include the bracket number and a reproduction start number. The bracket number is a variable for managing how many times shooting has been performed in one bracket-shooting set. The specifics of the processing of the reproduction mode and the reproduction start number will be described later using FIGS. 6A and 6B.

In the present embodiment, the tasks are not limited to the bracket shooting and the processing of the reproduction mode, and the task statuses are not limited to the bracket number and the reproduction start number. The present embodiment can be applied to any task that is executed in response to a user operation, and to the status thereof.

In step S301, the system control unit 50 executes initial processing. The initial processing displays information related to various types of shooting settings, including the remaining number of images that can be shot, ON or OFF of a flash, and image quality settings. When the digital camera 100 is set to a live-view mode, for example, live-view image capture and live-view display are performed. Furthermore, when task information (the bracket number) indicating the status of bracket shooting that was previously performed is recorded in the non-volatile memory 56, the system control unit 50 performs control to read out the task information to the system memory 52 so that the previous shooting can be continued. Specifically, in a case where the bracket number indicating how many times shooting was performed in one set was stored in later-described processing when the power was turned OFF by the auto power-OFF in the middle of the previous bracket shooting, the system control unit 50 reads out the stored bracket number. Then, the system control unit 50 performs control so that the bracket shooting can be continued. Furthermore, in step S301, the system control unit 50 uses the system timer 53 to start measurement (counting) by an auto power-OFF timer that measures a continuous period in which no operation is performed (a continuous period in which no user operation is performed).

As stated earlier, the digital camera 100 may store the bracket number by recording the bracket number to the non-volatile memory 56 during the bracket shooting. In this case, it is not necessary to read out the task information (bracket number) to the system memory 52 in step S301, and it is sufficient for the system control unit 50 to perform control so that the bracket shooting can be continued based on the task information recorded in the non-volatile memory 56.

In step S302, the system control unit 50 determines whether any sort of operation has been performed on the operation unit 70, the mode change switch 60, the shutter button 61, or the power switch 72. The processing proceeds to step S303 if any sort of operation has been performed, and proceeds to step S313 otherwise.

In step S303, the system control unit 50 resets and restarts the counting by the auto power-OFF timer.

In step S304, the system control unit 50 determines whether the operation performed in step S302 was an operation to set an auto power-OFF period. The processing proceeds to step S305 if the operation was to set the auto power-OFF, and proceeds to step S306 otherwise. In the present embodiment, it will be assumed that the operation to set the auto power-OFF period is an operation to press a menu button included in the operation unit 70 and select a setting item (candidate) of the auto power-OFF period from a displayed menu screen. Processing for setting the auto power-OFF period in step S305 will be described later using FIG. 4A.

In step S306, the system control unit 50 determines whether the operation performed in step S302 was half-pressing of the shutter button 61 (shooting preparation instruction) (i.e., whether the first shutter switch signal SW1 was issued). Hereinafter, the issuance of the first shutter switch signal SW1 will simply be expressed as turning ON of SW1. The processing proceeds to step S307 if SW1 was turned ON, and proceeds to step S308 otherwise. Shooting processing of step S307 will be described later using FIG. 5.

In step S308, the system control unit 50 determines whether the operation performed in step S302 was pressing of the reproduction button 79. The processing proceeds to step S309 and makes a transition to the reproduction mode if the operation was pressing of the reproduction button 79, and proceeds to step S310 otherwise. The specifics of the processing of the reproduction mode in step S309 will be described later using FIGS. 6A and 6B.

In step S310, the system control unit 50 determines whether the operation performed in step S302 was a user operation to turn OFF the power via the power switch 72 (a power-OFF operation). The processing proceeds to step S312 if the operation was to turn OFF the power, and proceeds to step S311 otherwise.

In step S311, the system control unit 50 executes another processing corresponding to another operation. For example, the system control unit 50 changes the setting values related to the shutter speed, the diaphragm, and so forth in response to an operation performed on the main electronic dial 71.

In step S312, the system control unit 50 clears information of the bracket number and the reproduction start number recorded in the system memory 52 or the non-volatile memory 56. Thereafter, the system control unit 50 turns OFF the power in step S317, and ends the processing. Such power-OFF caused by a user operation on the power switch 72 is the intentional power-OFF. In this case, it is presumed that the user had an intention to end the bracket shooting, which is a shooting sequence, despite in the middle of the bracket shooting. Therefore, the system control unit 50 discards the task information (bracket number) of the bracket shooting without storing the same. The system control unit 50 also turns OFF a bracket shooting flag (described later with reference to step S501 of FIG. 5). In this way, upon the next activation, the system control unit 50 does not commence the bracket shooting either from the start or from the middle. The same goes for reproduction: in the case of the intentional power-OFF caused by an operation on the power switch 72, the system control unit 50 discards the task information (reproduction start number) related to the reproduction, and does not start from the previously reproduced image in the reproduction following the next activation.

In the above description of step S312, the system control unit 50 clears the task information. However, when the task information of a task in execution is recorded to the volatile system memory 52, the task information is automatically cleared in the power-OFF processing of step S317, and thus the task information need not be explicitly cleared in step S312.

Moreover, even when the task information of a task in execution is recorded to the non-volatile memory 56, the task information need not be explicitly cleared in step S312 if the system control unit 50 executes some sort of processing for preventing this task information from being taken over upon the next activation. For example, the system control unit 50 turns OFF a take-over flag and records the same to the non-volatile memory 56 in step S312, and turns ON the take-over flag and records the same to the non-volatile memory 56 in later-described step S316. Upon the next activation, the system control unit 50 switches whether or not to take over the task information based on whether the take-over flag is ON or OFF.

If no operation was performed in step S302, the system control unit 50 causes the auto power-OFF timer to count up in step S313.

In step S314, the system control unit 50 determines whether the auto power-OFF timer indicates the elapse of the set auto power-OFF period (i.e., whether a continuous period in which no user operation is performed has reached the set period). If the auto power-OFF period has elapsed, the processing proceeds to step S315; otherwise, the processing returns to step S302, and the system control unit 50 continues to wait for operational input.

In step S315, the system control unit 50 determines whether the set auto power-OFF period recorded in the non-volatile memory 56 is longer than a predetermined period T1. The processing proceeds to step S312 if the auto power-OFF period is longer than the predetermined period T1, and proceeds to step S316 if the auto power-OFF period is equal to or shorter than the predetermined period T1. It will be assumed that T1 is 10 seconds, for example. Although another threshold may be set as T1, it is preferable that T1 be equal to or shorter than one minute because it is a threshold for discriminating whether the bracket shooting is presumed to be in progress.

In step S316, the system control unit 50 records the task information (the bracket number and the reproduction start number) recorded in the system memory 52 to the non-volatile memory 56 (when recording control for recording the task information to the volatile system memory 52 is performed during a task). Alternatively, the system control unit 50 maintains the task information (the bracket number and the reproduction start number) recorded in the non-volatile memory 56 as-is (when recording control for recording the task information to the non-volatile memory 56 is performed during a task). When the flag indicating that the bracket shooting is currently set (the bracket shooting flag) is ON, the system control unit 50 may record the same to the non-volatile memory 56. Thereafter, the system control unit 50 turns OFF the power in step S317, and ends the processing. Such power-OFF caused by the auto power-OFF is not the intentional power-OFF by the user. Furthermore, when the set auto power-OFF period is equal to or shorter than T1, there is a high possibility that the user has no intention to end the bracket shooting sequence. For example, there is a possibility that the power was unintentionally turned OFF while waiting for the timing for the next shooting with different exposure in the middle of the bracket shooting. Therefore, after exiting a power-OFF state attributed to the auto power-OFF (i.e., after the next activation), the system control unit 50 performs control so that the status of the bracket shooting at the time of the auto power-OFF is taken over. That is to say, the system control unit 50 records the task information (the bracket number) of the bracket shooting to the non-volatile memory 56 so that the bracket shooting can be continued (so that the next shooting with different exposure can be performed). The same goes for reproduction: when reproduction is performed after activation from a power-OFF state attributed to the auto power-OFF with a short auto power-OFF period, the system control unit 50 performs the reproduction from the image that was previously reproduced (so-called resume reproduction). To enable the resume reproduction, the system control unit 50 records information of the reproduction start number to the non-volatile memory 56.

In the present embodiment, even when the task status prior to the auto power-OFF is to be taken over upon power-ON that follows the auto power-OFF, it is not essential to immediately execute a task upon power-ON. The timing at which the system control unit 50 executes a task from the task status that has been taken over is determined as appropriate in accordance with, for example, the properties of the task and the task information and an operation mode of the digital camera 100. For example, when the power of the digital camera 100 is turned ON in a shooting mode, the system control unit 50 may start the resume reproduction when the operation mode is changed to the reproduction mode. In this case also, it is considered that the task status related to reproduction is taken over.

If the auto power-OFF period is longer than the predetermined period T1 in step S315, the process of step S312 is executed. The substance of this process is similar to the aforementioned process of step S312 that is executed after step S310; the system control unit 50 performs control to prevent the task information (the bracket number and the reproduction start number) from being taken over upon the next activation. Thereafter, the system control unit 50 turns OFF the power in step S317, and ends the processing. As stated earlier, there is a possibility that power-OFF caused by the auto power-OFF is not the intentional power-OFF by the user. However, when the auto power-OFF period is long, a sufficient amount of time has elapsed since the previous operation, and hence there is a possibility that the user has forgotten to turn OFF the power although the user had an intention to end the bracket shooting sequence or image viewing through reproduction. For this reason, the system control unit 50 performs control to prevent the task information (the bracket number and the reproduction start number) from being taken over upon the next activation. Furthermore, especially in the case of bracket shooting, even when the auto power-OFF has been performed without completing the shooting sequence, there is a possibility that the subject is no longer the same due to the elapse of a long period since the previous shooting. Although the purpose of the bracket shooting is to obtain images desired by the user more reliably by shooting the same subject multiple times under different settings (exposure settings), this purpose cannot be fulfilled if the subject does not remain the same. In view of this, when the auto power-OFF period is long, meaningless resuming of bracket shooting can be prevented by not taking over the bracket number.

In an example of FIGS. 3A and 3B, although the same T1 is used both as the threshold for the auto power-OFF period used in discarding the task information related to bracket shooting and as the threshold for the auto power-OFF period used in discarding the task information related to reproduction, different thresholds may be used in bracket shooting and reproduction. In this case, for example, the system control unit 50 discards the bracket number when the auto power-OFF period is longer than T1 in the case of bracket shooting, and discards the reproduction start number when the auto power-OFF period is longer than T2 in the case of reproduction. Although no particular restriction is intended regarding the relationship between the magnitudes of T1 and T2, the relationship T1<T2 may be satisfied (e.g., T1 is 10 seconds, and T2 is 5 minutes), for example. This is because, whereas it is considered that it is better not to continue the bracket shooting when the subject to be shot does not remain the same as stated earlier, there may be cases in which the user wants to continue the reproduction even if the location has changed. For example, the user who was viewing images on a train and performed no operation while switching to another train (the period of switching trains is longer than T1 and shorter than T2) may want to continue the reproduction after switching trains.

Furthermore, the system control unit 50 may be configured to take over the task information related to reproduction upon the next activation regardless of the cause of the power-OFF. In this case, when the power-OFF has been caused by the auto power-OFF, the system control unit 50 performs control to take over the task information related to reproduction regardless of the set auto power-OFF period (i.e., even when the following relationship is satisfied: the auto power-OFF period >T1). Furthermore, the system control unit 50 performs control to take over the task information related to reproduction even when the power-OFF has been caused by the power switch 72. In this case, as will be described later, the task information related to reproduction is discarded when shooting is performed, but resume reproduction is performed when shooting is not performed (when no new image is added after the previous production ended).

The specifics of the aforementioned processing for setting the auto power-OFF period in step S305 of FIG. 3B will now be described with reference to FIG. 4A. This processing is realized by deploying a program recorded in the non-volatile memory 56 to the system memory 52 and executing the deployed program in the system control unit 50, unless specifically stated otherwise.

In step S401, the system control unit 50 displays a setting screen for the auto power-OFF period on the display unit 28. FIG. 4B shows an example of the setting screen. The setting screen displays the following options as candidates for setting values of the auto power-OFF period: 10 seconds, 30 seconds, 1 minute, 5 minutes, 15 minutes, 30 minutes, and NO. The setting value "NO" represents a setting that does not perform the auto power-OFF in accordance with a period in which no operation is performed; when the auto power-OFF period is set to "NO," the result of determination in later-described step S402 is NO (shorter than T1) (because a warning is unnecessary in this case). A selection frame 410 (cursor) shows an option that is currently selected (the auto power-OFF period that is currently set). The user can select and set any of the foregoing options by moving the selection frame 410 up and down using the upper and lower buttons of the crisscross key 74 included in the operation unit 70.

In step S402, the system control unit 50 determines whether the currently set auto power-OFF period is longer than T1. The processing proceeds to step S403 if the auto power-OFF period is longer than T1, and proceeds to step S404 otherwise (if the auto power-OFF period is equal to or shorter than T1).

In step S403, the system control unit 50 displays, as a warning, a message indicating that camera setting information (the aforementioned task information related to bracket shooting and task information related to reproduction) is not stored at the time of the auto power-OFF if the currently set (selected) auto power-OFF period is used. FIG. 4C shows an example of the warning displayed on the display unit 28. The selection frame 410 is located on 30 seconds, that is to say, the auto power-OFF period is set to 30 seconds that is longer than T1 (assumed to be 10 seconds here). Therefore, the system control unit 50 displays a warning 411, thereby notifying the user in advance of the fact that, if this set period is used, the status of a task (e.g., bracket shooting) is not taken over when the power is turned OFF by the auto power-OFF. This enables the user to set an auto power-OFF period that better suits the user's intention. Note that when the set auto power-OFF period is equal to or shorter than T1, the system control unit 50 does not display the warning 411 as shown in FIG. 4B.

In step S404, the system control unit 50 determines whether an operation to change the auto power-OFF period has been performed. Specifically, the determination here is a determination as to whether an operation to move the selection frame 410 up and down has been performed using the upper and lower buttons of the crisscross key 74 included in the operation unit 70. The processing proceeds to step S405 if the operation to change the auto power-OFF period has been performed, and proceeds to step S406 otherwise.

In step S405, the system control unit 50 moves the selection frame 410, and records, as the auto power-OFF period, a period corresponding to an option on which the selection frame 410 is located to the non-volatile memory 56. The system control unit 50 also deletes the warning 411 if the warning 411 was displayed.

In step S406, the system control unit 50 determines whether an operation to close the setting screen for the auto power-OFF period (an operation to end the setting) has been performed. The setting screen for the auto power-OFF can be closed by, for example, pressing the menu button included in the operation unit 70 or pressing the shutter button 61 halfway. The processing returns to the flowchart of FIG. 3B if the operation to close the setting screen has been performed, and proceeds to step S404 otherwise.

The specifics of the aforementioned shooting processing in step S307 of FIG. 3B will now be described with reference to FIG. 5. This processing is realized by deploying a program recorded in the non-volatile memory 56 to the system memory 52 and executing the deployed program in the system control unit 50, unless specifically stated otherwise.

In step S501, the system control unit 50 determines whether bracket shooting is currently set. The bracket shooting is currently set and the flag indicating that the bracket shooting is currently set (the bracket shooting flag) is stored in the system memory 52 if the user performed an operation to start the bracket shooting in advance. Furthermore, the bracket number is stored in the system memory 52 as a variable indicating how many times shooting has been performed in one bracket-shooting set. An initial value of the bracket number is zero (zero images). If the bracket shooting flag is stored or information of the bracket number is stored, the system control unit 50 determines that the bracket shooting is currently set, and the processing proceeds to step S503. In the case of normal shooting other than the bracket shooting, the system control unit 50 proceeds to step S502.

In step S502, the system control unit 50 performs normal exposure calculation. That is to say, the system control unit 50 executes photometric calculation processing (AE processing) for determining the shutter speed (exposure period), the f-number, etc. The AE processing in step S502 is similar to bracket shooting using the reference value.

In step S503, the system control unit 50 performs exposure calculation in accordance with bracket settings. That is to say, the system control unit 50 executes photometric calculation processing (AE processing) for determining exposure values (the shutter speed (exposure period), the f-number, etc.) to be used in the next bracket shooting in accordance with the current bracket number.

In step S504, the system control unit 50 performs AF by controlling the lens system control circuit 4. Note that this process is not executed when manual focus (MF) is set.

In step S505, the system control unit 50 determines whether SW2 has been turned ON by fully pressing the shutter button 61. The processing proceeds to step S507 if SW2 has been turned ON, and proceeds to step S506 otherwise.

In step S506, the system control unit 50 determines whether the ON state of SW1 is maintained. If the ON state is maintained, the processing proceeds to step S505; otherwise, the system control unit 50 ends the shooting processing, and proceeds to step S302 of FIG. 3A.

In step S507, the system control unit 50 performs shooting (exposure) in accordance with the exposure period (shutter speed) based on the result of AE in step S502 or S503, and records a captured image as an image file to the recording medium 200.

In step S508, the system control unit 50 clears information of the reproduction start number recorded in the system memory 52 or the non-volatile memory 56. As a result, when reproduction is performed next, resume reproduction is not performed and the latest image is reproduced.

In step S509, the system control unit 50 determines whether bracket shooting is currently set, similarly to step S501. If the bracket shooting is currently set, the processing proceeds to step S510; otherwise, the system control unit 50 ends the shooting processing, and proceeds to step S302 of FIG. 3A.

In step S510, the system control unit 50 increments the bracket number stored in the system memory 52 by one.

In step S511, the system control unit 50 determines whether the bracket number has reached the set number, that is to say, whether one bracket-shooting set has ended. If the bracket number has reached the set number, the processing proceeds to step S512. Otherwise, the system control unit 50 ends the shooting processing, and proceeds to step S302 of FIG. 3A.

In step S512, the system control unit 50 cancels the settings of the bracket shooting. That is to say, the system control unit 50 turns OFF the bracket shooting flag and discards the variable serving as the bracket number.

Figure 6A:
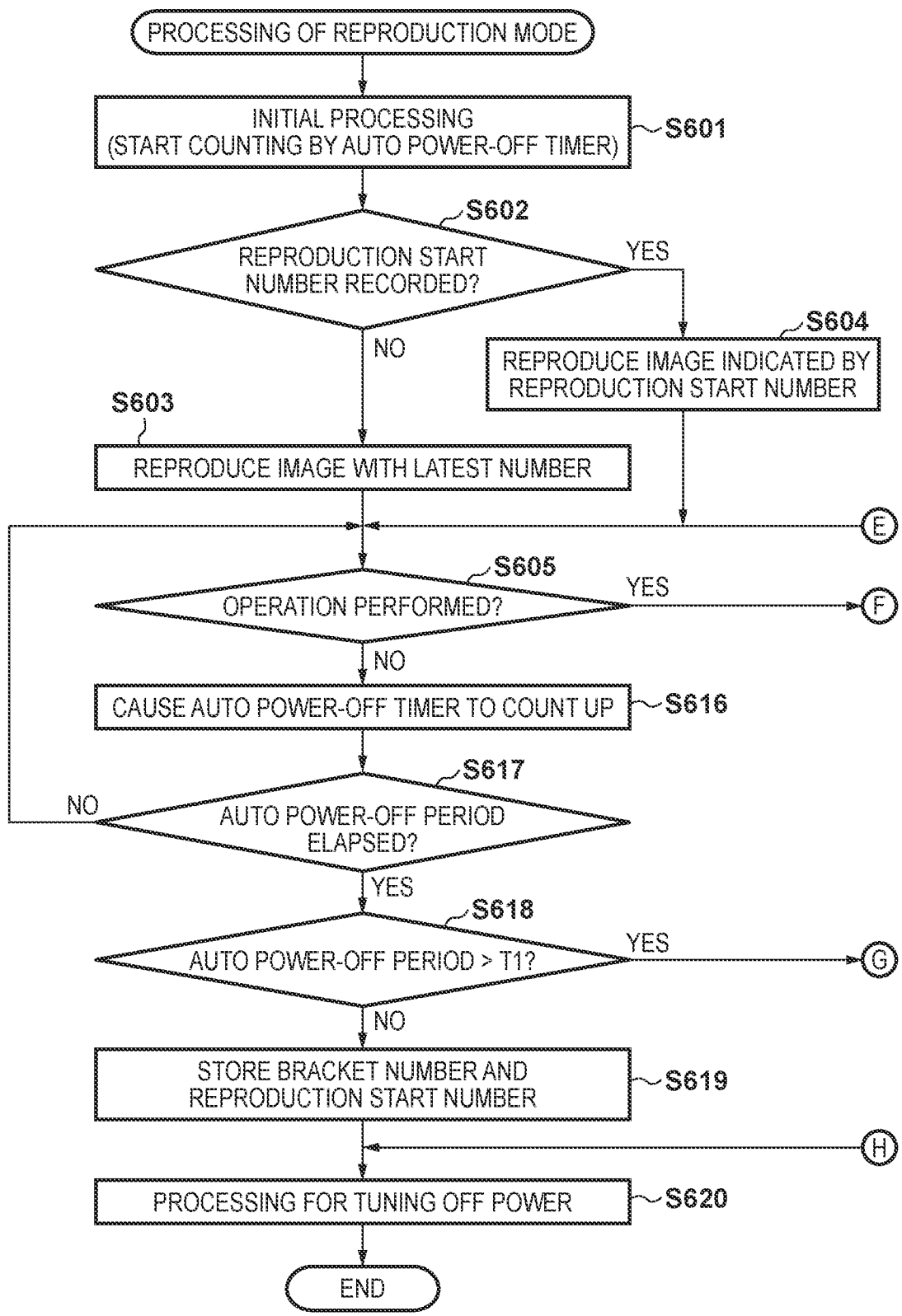
FIGS. 6A and 6B are flowcharts of processing of a reproduction mode (step S309).
Figure 6B:
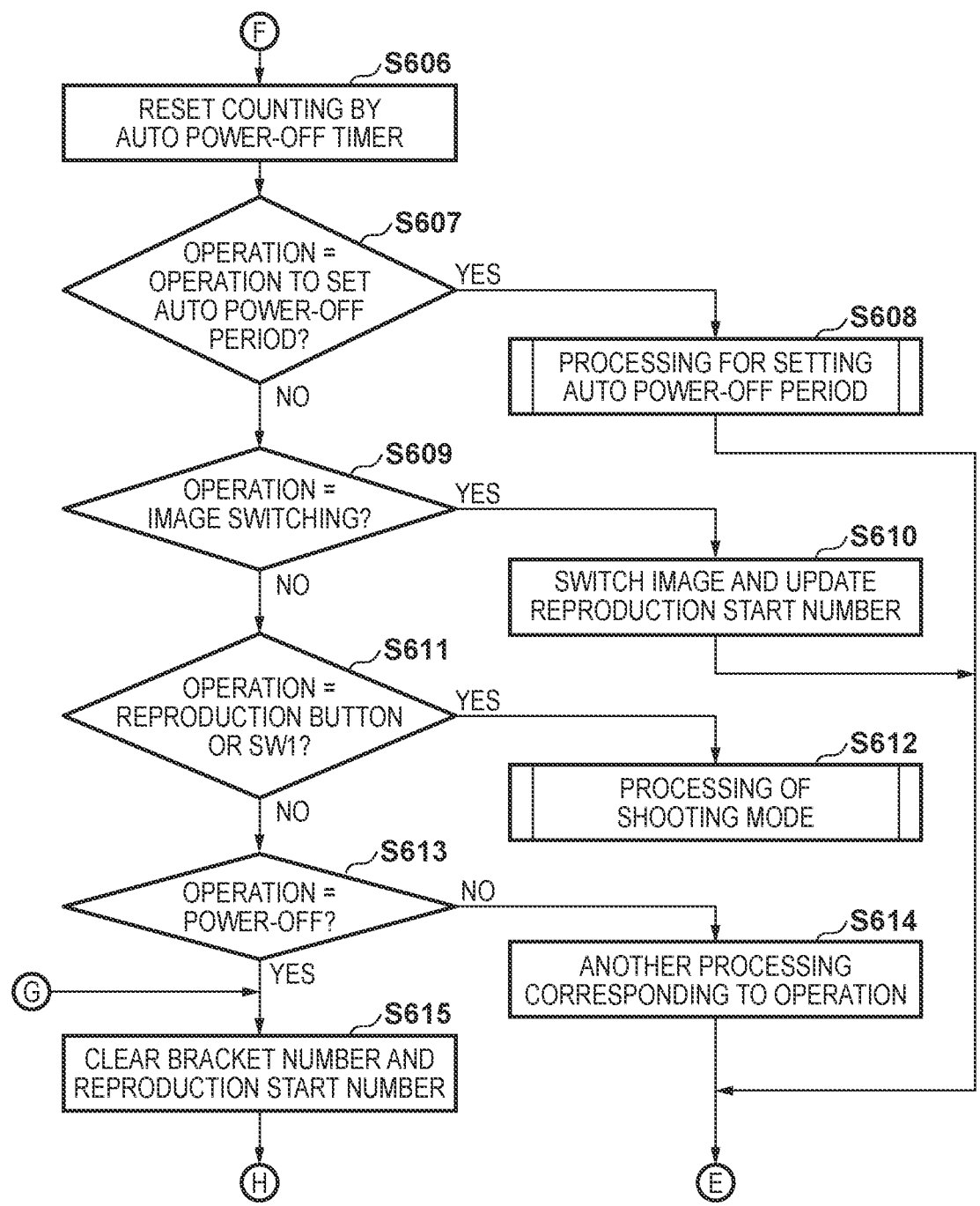

The specifics of the aforementioned processing of the reproduction mode in step S309 of FIG. 3B will now be described with reference to FIGS. 6A and 6B. This processing is realized by deploying a program recorded in the non-volatile memory 56 to the system memory 52 and executing the deployed program in the system control unit 50.

In step S601, the system control unit 50 executes initial processing, for example, reads in management information of images recorded in the recording medium 200, and causes the auto power-OFF timer to start counting.

In step S602, the system control unit 50 determines whether task information related to reproduction (the reproduction start number) is recorded in the system memory 52. The processing proceeds to step S604 if the reproduction start number is recorded, and proceeds to step S603 if the reproduction start number is not recorded (or there is no information indicating that resume reproduction is to be performed).

In step S603, the system control unit 50 reproduces the latest image (the image that was last shot) among the images recorded in the recording medium 200, and displays the reproduced image on the display unit 28.

In step S604, the system control unit 50 reproduces an image indicated by the reproduction start number among the images recorded in the recording medium 200, and displays the reproduced image on the display unit 28. That is to say, the system control unit 50 performs the resume reproduction.

The processes of steps S605 to S608 are similar to the aforementioned processes of steps S302 to S305 in FIGS. 3A and 3B.

In step S609, the system control unit 50 determines whether the operation performed in step S605 was an operation to switch the image displayed on the display unit 28 (to the next image or the previous image) (a switching operation). The processing proceeds to step S610 if the operation was to switch the image, and proceeds to step S611 otherwise.

In step S610, the system control unit 50 switches the image displayed on the display unit 28, and updates information of the reproduction start number stored in the system memory 52 to information indicating the image to be displayed after the switching operation.

In step S611, the system control unit 50 determines whether the operation performed in step S605 was pressing of the reproduction button 79 or turning ON of SW1. The processing proceeds to step S612 and makes a transition to a shooting mode if the operation was pressing of the reproduction button 79 or turning ON of SW1, and proceeds to step S613 otherwise. The shooting mode processing of step S612 is the processing that has been described with reference to FIGS. 3A and 3B. That is to say, a transition is made from the process of step S612 to the process of step S301.

In step S613, the system control unit 50 determines whether the operation performed in step S605 was an operation to turn OFF the power via the power switch 72. The processing proceeds to step S615 if the operation was to turn OFF the power, and proceeds to step S614 otherwise.

In step S614, the system control unit 50 executes another processing corresponding to another operation. For example, the system control unit 50 deletes or enlarges the image.

The processes of steps S615 to S620 are similar to the aforementioned processes of steps S312 to S317 in FIGS. 3A and 3B. That is to say, if the user intentionally turned OFF the power using the power switch 72, the system control unit 50 performs control to prevent the task information (the bracket number and the reproduction start number) from being taken over upon the next activation. On the other hand, if the power-OFF has been caused by the auto power-OFF, the system control unit 50 performs control to take over the task information when the auto power-OFF period is equal to or shorter than T1, and performs control to prevent the task information from being taken over when the auto power-OFF period is longer than T1.

In the foregoing embodiment, when the bracket number is discarded in response to the power-OFF, the system control unit 50 turns OFF the bracket shooting flag, and does not commence the bracket shooting either from the start or from the middle upon the next activation. However, the system control unit 50 may be configured to clear the bracket number, but not to turn OFF the bracket shooting flag. In this case, upon the next activation, the bracket number is initialized to zero, and the system control unit 50 commences the bracket shooting from the start (from the first image). Thus, task information regarding the bracket shooting, which the system control unit 50 switches whether or not to take over, may contain both the bracket number and the bracket shooting flag, or may contain only the bracket number.

Although the foregoing embodiment has introduced shooting with exposure bracketing (AEB) as bracket shooting, the present embodiment can also be applied to bracket shooting other than AEB. For example, the scope of the present embodiment includes shooting with focus bracketing whereby a focus position is automatically shifted each time shooting is performed, shooting with WB bracketing whereby a white balance (WB) setting value is automatically shifted each time shooting is performed, etc.

Furthermore, the present embodiment can be applied to a shooting method other than bracket shooting as long as the shooting method carries out one shooting set in which shooting is performed multiple times. For example, the present embodiment can be applied to a shooting method that composites together images obtained by performing shooting multiple times in one shooting set. In this case also, when the power has been intentionally turned OFF using the power switch 72, the system control unit 50 discards task information indicating how many times shooting has been performed in a shooting sequence composing one shooting set. When the power-OFF has been caused by the auto power-OFF, the system control unit 50 stores the task information when the auto power-OFF period is equal to or shorter than T1, and discards the task information when the auto power-OFF period is longer than T1. In this case, instead of T1 for determining whether to discard the task information related to bracket shooting, T3 that is different from T1 may be used as the setting period of the auto power-OFF, which serves as a threshold. The following are examples of the shooting method to which the present embodiment can be applied, that is to say, the shooting method that carries out one shooting set in which shooting is performed multiple times.

Multiple exposure shooting: one shooting set to obtain a composite image by superimposing together images that have been obtained by performing shooting multiple times based on a predetermined composition ratio, composition using relatively bright parts, composition using relatively dark parts, and so forth.

Panorama shooting: one shooting set to obtain a panorama image by compositing together images that have been obtained by performing shooting multiple times in a planar direction, e.g., in a left-right direction or an up-down direction.

Layout shooting (collage shooting): one shooting set to obtain one composite image by arranging images that have been obtained by performing shooting multiple times on a plane in accordance with a predetermined layout.

As described above, according to the first embodiment, when the auto power-OFF has been performed, the digital camera 100 switches whether or not to take over a task status at the time of the auto power-OFF when it is placed in a power-ON state next based on the auto power-OFF period. Specifically, when the auto power-OFF period is equal to or shorter than a threshold period, the digital camera 100 performs control to take over the task status at the time of the auto power-OFF (status control). On the other hand, when the auto power-OFF period is longer than the threshold period, the digital camera 100 performs control so as not to take over the task status at the time of the auto power-OFF (status control). This makes it possible to more appropriately select whether to take over the task status prior to the auto power-OFF when the power of the electronic device is turned ON after the auto power-OFF.

With regard to such shooting settings as a recording size, a shooting mode, shooting of single image/continuous images, white balance settings, and ISO settings, the digital camera 100 may perform control to take over the shooting settings at the time of the auto power-OFF regardless of the auto power-OFF period. Furthermore, the digital camera 100 may perform control to turn OFF a self-timer shooting function when the auto power-OFF has been performed regardless of the auto power-OFF period.

First Exemplary Modification

Figure 7:
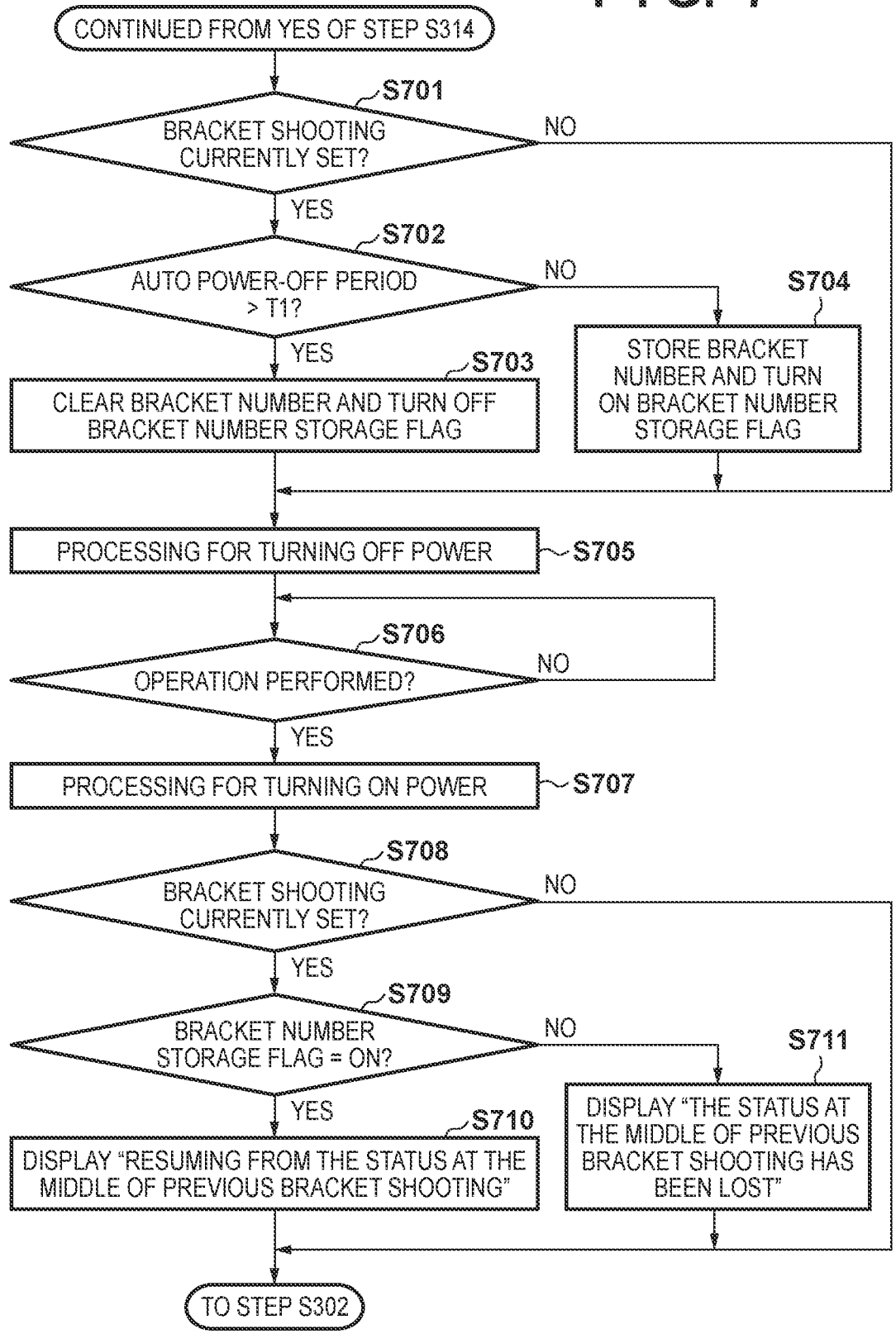
FIG. 7 is a flowchart according to a first exemplary modification.

With reference to FIG. 7, the following describes an exemplary modification of a part concerning task information related to bracket shooting among the processes of steps S315 to S317 that follow step S314 in FIG. 3A. Among the processes of steps S315 to S317 that follow step S314 in FIG. 3A, the processes of the part concerning task information related to bracket shooting are replaced with the processes shown in FIG. 7. In the first exemplary modification, the processes of a part concerning task information related to reproduction are similar to, for example, the processes of steps S315 to S317 in FIG. 3A. The processes shown in FIG. 7 are realized by deploying a program recorded in the non-volatile memory 56 to the system memory 52 and executing the deployed program in the system control unit 50, unless specifically stated otherwise.

Figure 5:
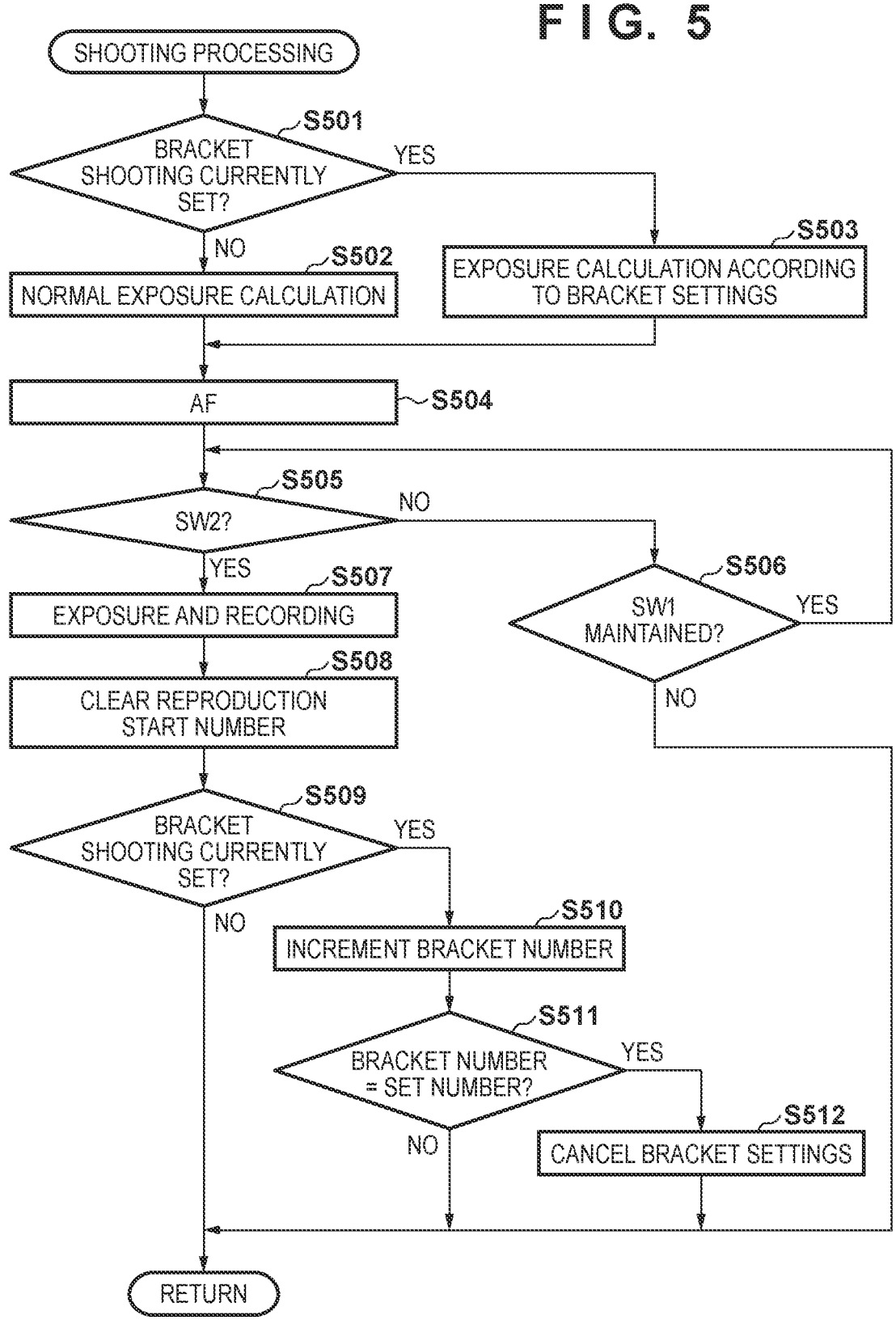
FIG. 5 is a flowchart of shooting processing (step S307).

In step S701, the system control unit 50 determines whether bracket shooting is currently set, similarly to step S501 of FIG. 5. The processing proceeds to step S702 if the bracket shooting is currently set, and proceeds to step S705 otherwise.

In step S702, the system control unit 50 determines whether the auto power-OFF period is longer than T1. The processing proceeds to step S703 if the auto power-OFF period is longer than T1, and proceeds to step S704 if the auto power-OFF period is equal to or shorter than T1.

In step S703, the system control unit 50 clears the bracket number. Note that the system control unit 50 maintains the ON state of the bracket shooting flag. The system control unit 50 also turns OFF a bracket number storage flag and stores the same to the non-volatile memory 56.

In step S704, the system control unit 50 stores the bracket number. The system control unit 50 also turns ON the bracket number storage flag and stores the same to the non-volatile memory 56.

In step S705, the system control unit 50 turns OFF the power, similarly to step S317 of FIG. 3A. In step S706, the system control unit 50 determines whether an operation to exit an auto power-OFF state has been performed. For example, the system control unit 50 determines that an operation to exit the auto power-OFF state has been performed when some sort of operation has been performed on the operation unit 70, the mode change switch 60, the shutter button 61, or the power switch 72. If an operation to exist the auto power-OFF state has been performed, the processing proceeds to step S707; otherwise, the determination of step S706 is repeated.

In step S707, the system control unit 50 turns ON the power. In step S708, the system control unit 50 determines whether the bracket shooting is currently set. The processing proceeds to step S709 if the bracket shooting is currently set, and proceeds to step S302 of FIG. 3A otherwise.

In step S709, the system control unit 50 determines whether the bracket number storage flag is ON. The processing proceeds to step S710 if the bracket number storage flag is ON, and proceeds to step S711 otherwise.

In step S710, the system control unit 50 displays a message indicating "resuming from the status at the middle of previous bracket shooting" on the display unit 28, thereby notifying the user of the fact that the task status related to the bracket shooting is to be taken over.

In step S711, the system control unit 50 displays a message indicating "the status at the middle of previous bracket shooting has been lost" on the display unit 28, thereby notifying the user of the fact that the task status related to the bracket shooting is not to be taken over. At this time, the system control unit 50 may change the bracket shooting flag to the OFF state.

Second Exemplary Modification

Figure 8:
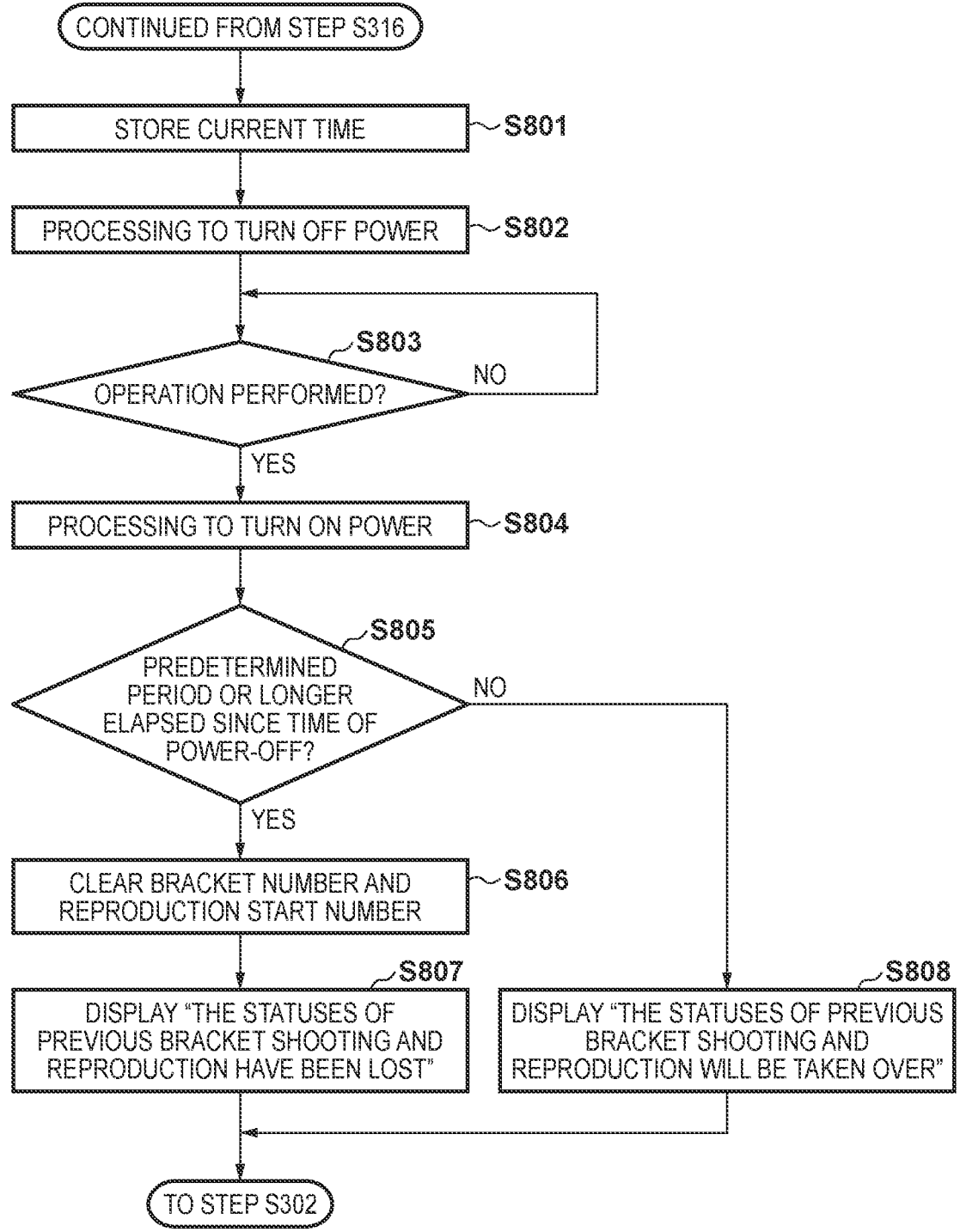
FIG. 8 is a flowchart according to a second exemplary modification.

With reference to FIG. 8, the following describes an exemplary modification of the process of step S317 that follows step S316 in FIG. 3A. The process of step S317 that follows step S316 in FIG. 3A is replaced with the processes shown in FIG. 8. The processes shown in FIG. 8 are realized by deploying a program recorded in the non-volatile memory 56 to the system memory 52 and executing the deployed program in the system control unit 50, unless specifically stated otherwise.

In step S801, the system control unit 50 stores the current time (the time of power-OFF caused by the auto power-OFF) to the non-volatile memory 56. In step S802, the system control unit 50 turns OFF the power, similarly to step S317 of FIG. 3A.

In step S803, the system control unit 50 determines whether an operation to exit an auto power-OFF state has been performed. For example, the system control unit 50 determines that an operation to exit the auto power-OFF state has been performed when some sort of operation has been performed on the operation unit 70, the mode change switch 60, the shutter button 61, or the power switch 72. If an operation to exit the auto power-OFF state has been performed, the processing proceeds to step S804; otherwise, the determination of step S803 is repeated.

In step S804, the system control unit 50 turns ON the power. In step S805, the system control unit 50 determines whether a predetermined period or longer has elapsed since the time of power-OFF stored in step S801. The processing proceeds to step S806 if the predetermined period or longer has elapsed, and proceeds to step S808 otherwise.

In step S806, the system control unit 50 clears task information (the bracket number and the reproduction start number), similarly to step S312 of FIG. 3B. In step S807, the system control unit 50 displays a message indicating "the statuses of previous bracket shooting and reproduction have been lost" on the display unit 28, thereby notifying the user of the fact that the task statuses are not to be taken over. Thereafter, the processing proceeds to step S302.

In step S808, the system control unit 50 displays a message indicating "the statuses of previous bracket shooting and reproduction will be taken over" on the display unit 28, thereby notifying the user of the fact that the task statuses are to be taken over. Thereafter, the processing proceeds to step S302.

After the auto power-OFF, there is a possibility that the user has no intention to continue a task if the power is turned ON again after the elapse of a long period since the time of the auto power-OFF, even when the auto power-OFF period is equal to or shorter than T1. In view of this, in the second exemplary modification, the system control unit 50 performs control so as not to take over task information if the power is turned ON again after the elapse of a long period since the time of the auto power-OFF. This can reduce the possibility that a task (e.g., bracket shooting) is continued against the user's intention.

Third Exemplary Modification

Figure 4A:
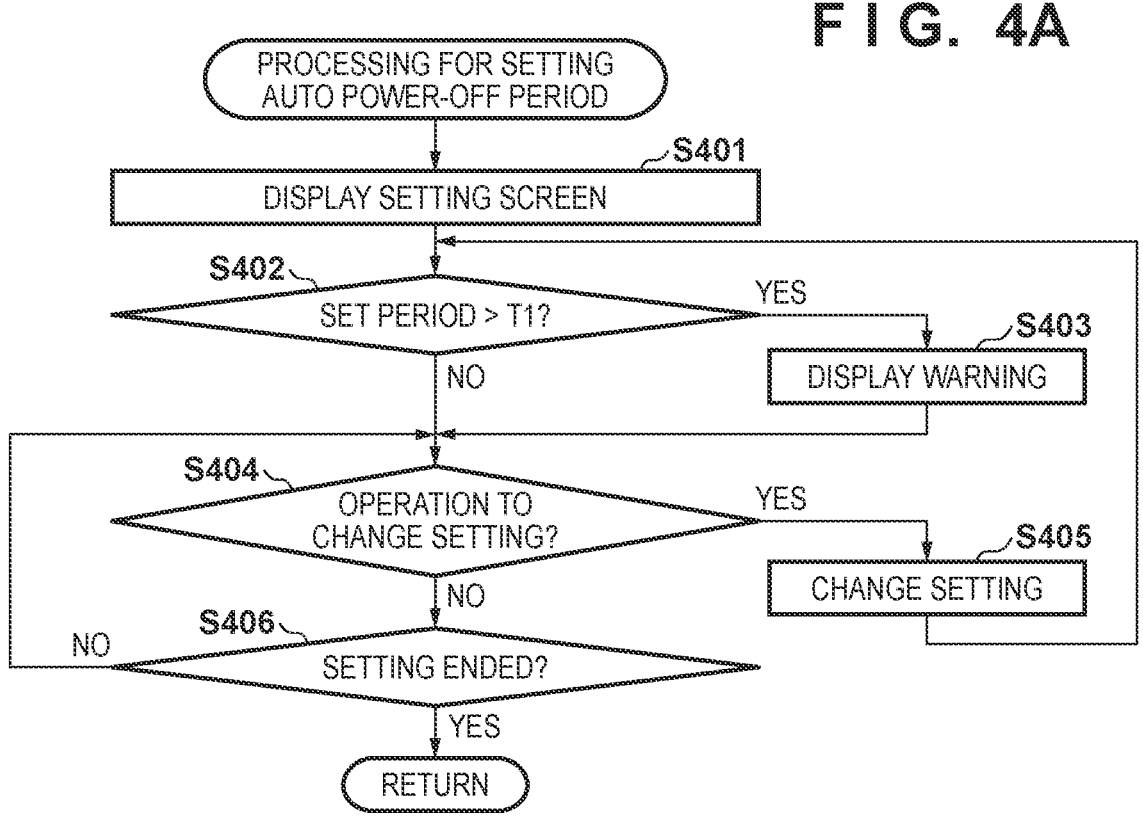
FIG. 4A is a flowchart of processing for setting an auto power-OFF period (step S305).
Figure 4B:
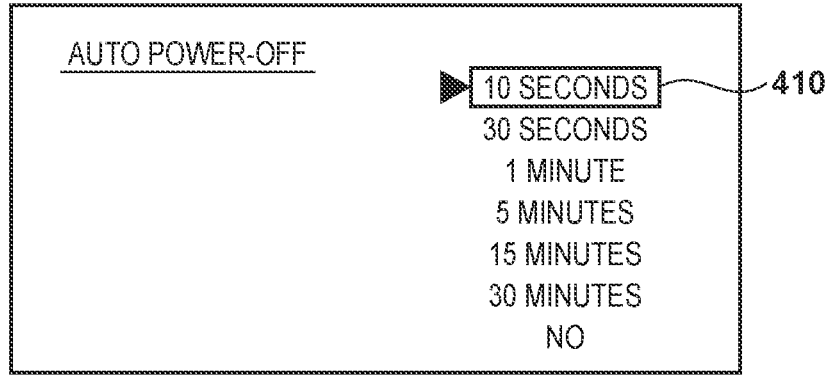
FIGS. 4B and 4C show examples of a setting screen for the auto power-OFF period.
Figure 4C:
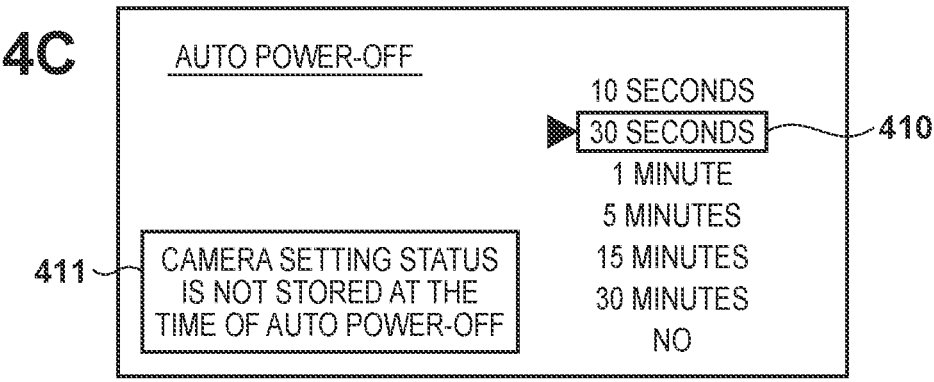

The following describes processing that is additionally executed when the result of determination in step S402 of FIG. 4A is NO. The user can select task information to be taken over by, for example, operating the operation unit 70. For example, the system control unit 50 displays two checkboxes that are respectively accompanied by the text "bracket number" and "reproduction start number" on the display unit 28. The system control unit 50 takes over the task information corresponding to the checked item(s) in the processes of step S316 in FIG. 3A and step S619 in FIG. 6A. That is to say, in accordance with a user operation, the system control unit 50 can switch whether or not to perform control to take over a task status upon the next activation when the auto power-OFF has been performed with the auto power-OFF period set to a threshold or less.

Fourth Exemplary Modification

In the foregoing description, the auto power-OFF is control to automatically place the digital camera 100 in the power-OFF state. However, the substance of auto power-OFF control is not limited in this way. In a generalized case, the auto power-OFF may be any control to switch from a normal operation mode (first operation mode) in which the digital camera 100 is in the power-ON state to an operation mode (second operation mode) that consumes less power than the first operation mode. The second operation mode is, for example, the power-OFF state of the digital camera 100, a power-saving mode of the digital camera 100, or a state in which the display unit 28 of the digital camera 100 is OFF.

Other Embodiments

Various types of control that are performed by the system control unit 50 in the foregoing description may be performed by one item of hardware, or the entire apparatus may be controlled by a plurality of items of hardware share processing.

Although the present invention has been elaborated based on a preferred embodiment thereof, the present invention is not limited to such a specific embodiment, and includes a variety of embodiments that fall within the principles of the present invention. The above-described embodiment is merely one illustrative embodiment of the present invention, and may be combined with other embodiments as appropriate.

Although the above-described embodiment has introduced an example in which the present invention is applied to a digital camera, the present invention is not limited to this example, and can be applied to an electronic device that has an auto power-OFF function and executes some sort of task in accordance with a user operation. That is to say, the present invention can be applied to a personal computer, a PDA, a mobile telephone terminal, a mobile image viewer, a display-equipped printer apparatus, a digital photo frame, a music player, a game console, an electronic book reader, etc. The present invention can also be applied to a tablet terminal, a smartphone, a projection apparatus, a display-equipped home electronic apparatus, an onboard apparatus, etc.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-234419, filed Dec. 1, 2016, which is hereby incorporated by reference herein in its entirety.

What is claimed is:

1. An electronic device comprising at least one processor and/or at least one circuit which function as:
   a power control unit configured to, in response to a continuous period in which no user operation is executed having reached a set period, execute auto power-OFF that causes the electronic device to automatically switch from a first operation mode to a second operation mode, the second operation mode consuming less power than the first operation mode and the second operation mode being a power-OFF state of the electronic device;
   a setting unit configured to set the set period; and
   a status control unit configured to
   in a case where the auto power-OFF is executed when a period equal to or shorter than a first period is set as the set period, perform control so that a first operation status at the time of the execution of the auto power-OFF is taken over when the electronic device is placed in the first operation mode next, and
   in a case where the auto power-OFF is executed when a period longer than the first period is set as the set period, perform control so that the first operation status at the time of the execution of the auto power-OFF is not taken over when the electronic device is placed in the first operation mode next.

2. The electronic device according to claim 1, wherein the at least one processor and/or at least one circuit further function as
   a recording control unit configured to record first operation information indicating the first operation status to a recording medium.

3. The electronic device according to claim 2, wherein the second operation mode is a power-OFF state of the electronic device,
   the recording medium is a volatile recording medium, and
   in the case where the auto power-OFF is executed when the period equal to or shorter than the first period is set as the set period, the status control unit records the first operation information to a nonvolatile recording medium.

4. The electronic device according to claim 2, wherein the recording medium is a nonvolatile recording medium, and
   in the case where the auto power-OFF is executed when the period longer than the first period is set as the set period, the status control unit deletes the first operation information from the nonvolatile recording medium.

5. The electronic device according to claim 1, wherein the power control unit is configured to cause the electronic device to switch from the first operation mode to the second operation mode in response to a power-OFF operation executed by a user, and
   in a case where the electronic device is placed in the second operation mode by the power-OFF operation, the status control unit performs control so that the first operation status at the time of the execution of the power-OFF operation is not taken over when the electronic device is placed in the first operation mode next, regardless of the set period.

6. The electronic device according to claim 1, wherein the at least one processor and/or at least one circuit further function as
   a shooting control unit configured to carry out one shooting set in which shooting is performed multiple times in response to multiple shooting instructions, wherein
   the first operation status indicates a progress of the one shooting set, and
   in the case where the auto power-OFF is executed when the period equal to or shorter than the first period is set as the set period, the status control unit performs control to enable the shooting control unit to, when the electronic device is placed in the first operation mode next, continue the one shooting set in progress at the time of the execution of the auto power-OFF.

7. The electronic device according to claim 6, wherein the one shooting set is one shooting set for shooting with auto bracketing, and
   the first operation status indicates how many times shooting has been performed in the one shooting set for the shooting with auto bracketing.

8. The electronic device according to claim 7, wherein the shooting with auto bracketing is shooting with exposure bracketing whereby exposure is changed each time shooting is performed.

9. The electronic device according to claim 7, wherein the shooting with auto bracketing is shooting with focus bracketing whereby a focus position is changed each time shooting is performed.

10. The electronic device according to claim 7, wherein the shooting with auto bracketing is shooting with WB bracketing whereby a white balance setting value is changed each time shooting is performed.

11. The electronic device according to claim 6, wherein the one shooting set is intended to obtain a composite image by compositing together images that have been obtained by performing shooting multiple times.

12. The electronic device according to claim 11, wherein the one shooting set is multiple exposure shooting, is intended to obtain a panorama image, or is intended to obtain one composite image by arranging images that have been obtained by performing shooting multiple times on a plane in accordance with a predetermined layout.

13. The electronic device according to claim 1, wherein the at least one processor and/or at least one circuit further function as
   a display control unit configured to perform control to display an image that has been selected from among a plurality of images on a display unit, and switch the selected image to another image in response to a switching operation executed by a user, wherein
   the first operation status indicates an image that has been selected most recently in response to the switching operation, and
   in the case where the auto power-OFF is executed when the period equal to or shorter than the first period is set as the set period, the status control unit performs control to enable the display control unit to, when the electronic device is placed in the first operation mode next, display the image indicated by the first operation status at the time of the execution of the auto power-OFF.

14. The electronic device according to claim 1, wherein the at least one processor and/or at least one circuit further function as:
   a shooting control unit configured to carry out one shooting set in which shooting is performed multiple times in response to multiple shooting instructions; and
   a display control unit configured to perform control to display an image that has been selected from among a plurality of images on a display unit, and switch the selected image to another image in response to a switching operation executed by a user, wherein
   in the case where the auto power-OFF is executed when the period equal to or shorter than the first period is set as the set period, the status control unit performs control to enable the shooting control unit to perform continue the one shooting set in progress at the time of the execution of the auto power-OFF, and enable the display control unit to display an image indicated by a second operation status at the time of the execution of the auto power-OFF, when the electronic device is placed in the first operation mode next,
   in a case where the auto power-OFF is executed when a period equal to or shorter than a second period that is longer than the first period is set as the set period, the status control unit performs control to enable the display control unit to, when the electronic device is placed in the first operation mode next, display the image indicated by the second operation status at the time of the execution of the auto power-OFF,
   in a case where the auto power-OFF is executed when a period longer than the second period is set as the set period, the status control unit performs control so that the second operation status at the time of the execution of the auto power-OFF is not taken over when the electronic device is placed in the first operation mode next,
   the first operation status indicates a progress of the one shooting set, and
   the second operation status indicates an image that has been selected most recently in response to the switching operation.

15. The electronic device according to claim 1, wherein the first period is equal to or shorter than one minute.

16. The electronic device according to claim 1, wherein the at least one processor and/or at least one circuit further function as
   a first notification unit configured to, in response to the setting unit having set the period longer than the first period as the set period, notify a user of a fact that once the auto power-OFF has been executed, the first operation status at the time of the execution of the auto power-OFF is not taken over.

17. The electronic device according to claim 1, wherein the setting unit sets the set period by selecting one of a plurality of candidates.

18. The electronic device according to claim 1, wherein the at least one processor and/or at least one circuit further function as
   a second notification unit configured to
   in a case where the first operation status at the time of the execution of the auto power-OFF is to be taken over, notify a user of a fact that the first operation status at the time of the execution of the auto power-OFF is taken over, in response to the electronic device being placed in the first operation mode next, and
   in a case where the first operation status at the time of the execution of the auto power-OFF is not to be taken over, notify the user of a fact that the first operation status at the time of the execution of the auto power-OFF is not taken over, in response to the electronic device being placed in the first operation mode next.

19. The electronic device according to claim 1, wherein even in the case where the auto power-OFF is executed when the period equal to or shorter than the first period is set as the set period, if a predetermined period or longer has elapsed since the execution of the auto power-OFF when the electronic device is placed in the first operation mode next, the status control unit performs control so that the first operation status at the time of the execution of the auto power-OFF is not taken over.

20. The electronic device according to claim 1, wherein the at least one processor and/or at least one circuit further function as
   a switching unit configured to switch, in accordance with a user operation, whether the status control unit performs control so that the first operation status at the time of the execution of the auto power-OFF is taken over or whether the status control unit performs control so that the first operation status at the time of the execution of the auto power-OFF is not taken over, in the case where the auto power-OFF is executed when the period equal to or shorter than the first period is set as the set period and when the electronic device is placed in the first operation mode next.

21. An electronic device comprising at least one processor and/or at least one circuit which function as:
   a power control unit configured to, in response to a continuous period in which no user operation is executed having reached a set period, execute auto power-OFF that causes the electronic device to automatically switch from a first operation mode to a second operation mode, the second operation mode consuming less power than the first operation mode and the second operation mode being a power-saving mode;
   a setting unit configured to set the set period; and
   a status control unit configured to
   in a case where the auto power-OFF is executed when a period equal to or shorter than a first period is set as the set period, perform control so that a first operation status at the time of the execution of the auto power-OFF is taken over when the electronic device is placed in the first operation mode next, and
   in a case where the auto power-OFF is executed when a period longer than the first period is set as the set period, perform control so that the first operation status at the time of the execution of the auto power-OFF is not taken over when the electronic device is placed in the first operation mode next.

22. An electronic device comprising at least one processor and/or at least one circuit which function as:
   a power control unit configured to, in response to a continuous period in which no user operation is executed having reached a set period, execute auto power-OFF that causes the electronic device to automatically switch from a first operation mode to a second operation mode, the second operation mode consuming less power than the first operation mode and the second operation mode being a state in which a display of the electronic device is OFF;
   a setting unit configured to set the set period; and
   a status control unit configured to
   in a case where the auto power-OFF is executed when a period equal to or shorter than a first period is set as the set period, perform control so that a first operation status at the time of the execution of the auto power-OFF is taken over when the electronic device is placed in the first operation mode next, and in a case where the auto power-OFF is executed when a period longer than the first period is set as the set period, perform control so that the first operation status at the time of the execution of the auto power-OFF is not taken over when the electronic device is placed in the first operation mode next.

23. A control method executed by an electronic device, comprising:

in response to a continuous period in which no user operation is executed having reached a set period, executing auto power-OFF that causes the electronic device to automatically switch from a first operation mode to a second operation mode, the second operation mode consuming less power than the first operation mode and the second operation mode being a power-OFF state of the electronic device;

setting the set period;

in a case where the auto power-OFF is executed when a period equal to or shorter than a first period is set as the set period, performing control so that a first operation status at the time of the execution of the auto power-OFF is taken over when the electronic device is placed in the first operation mode next; and in a case where the auto power-OFF is executed when a period longer than the first period is set as the set period, performing control so that the first operation status at the time of the execution of the auto power-OFF is not taken over when the electronic device is placed in the first operation mode next.

24. A non-transitory computer-readable storage medium which stores a program for causing a computer to execute a control method comprising:

in response to a continuous period in which no user operation is executed having reached a set period, executing auto power-OFF that causes an electronic device to automatically switch from a first operation mode to a second operation mode, the second operation mode consuming less power than the first operation mode and the second operation mode being a power-OFF state of the electronic device;

setting the set period;

in a case where the auto power-OFF is executed when a period equal to or shorter than a first period is set as the set period, performing control so that a first operation status at the time of the execution of the auto power-OFF is taken over when the electronic device is placed in the first operation mode next; and in a case where the auto power-OFF is executed when a period longer than the first period is set as the set period, performing control so that the first operation status at the time of the execution of the auto power-OFF is not taken over when the electronic device is placed in the first operation mode next.

* * * * *